Aug. 28, 1923.　　　　　　　　　　　　　　1,466,467
J. BURT
LATHE
Filed May 9, 1921.　　　　3 Sheets-Sheet 2

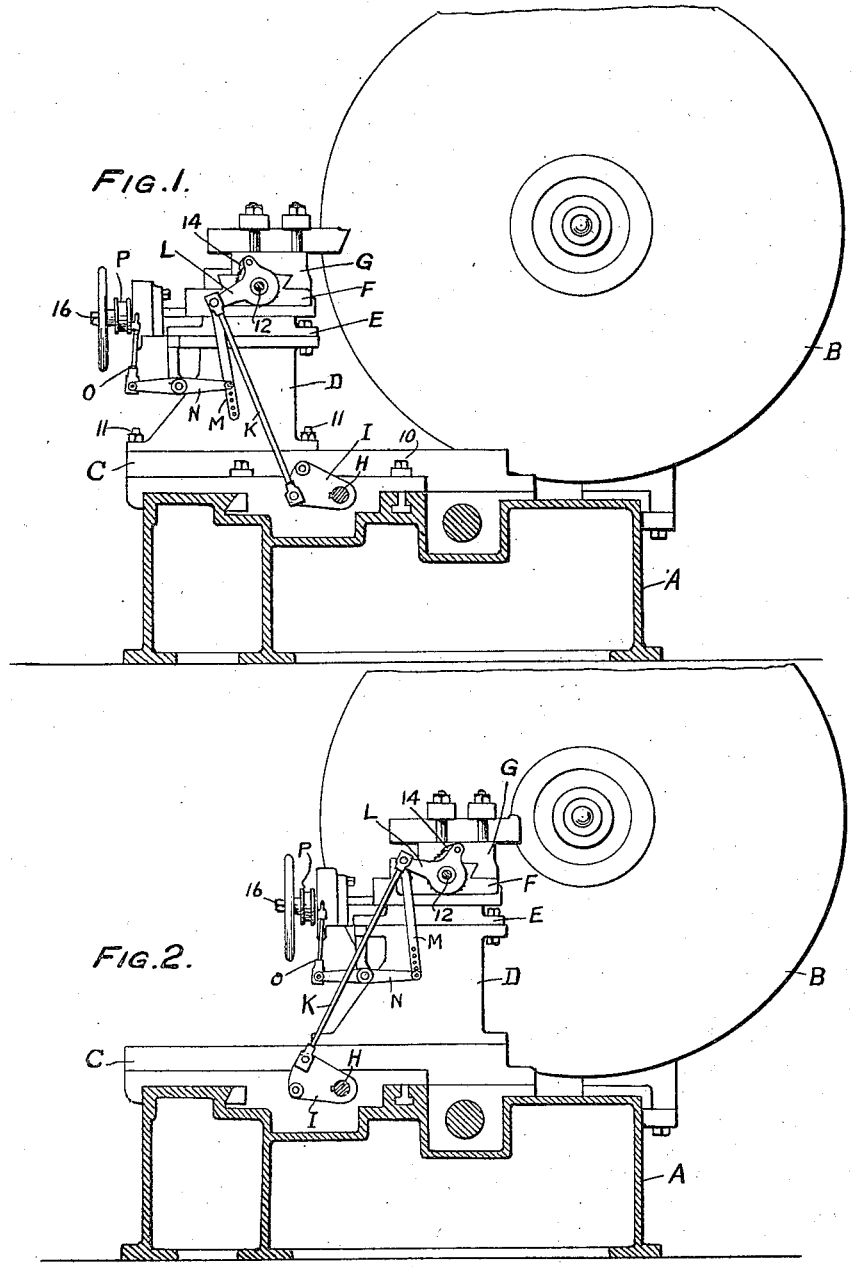

WITNESS:

INVENTOR
John Burt
BY
ATTORNEY.

Patented Aug. 28, 1923.

1,466,467

UNITED STATES PATENT OFFICE.

JOHN BURT, OF NARBERTH, PENNSYLVANIA, ASSIGNOR TO WILLIAM SELLERS & COMPANY, INCORPORATED, OF PHILADELPHIA, PENNSYLVANIA, A CORPORATION OF PENNSYLVANIA.

LATHE.

Application filed May 9, 1921. Serial No. 467,843.

*To all whom it may concern:*

Be it known that I, JOHN BURT, a citizen of the United States, residing at Narberth, county of Montgomery, and State of Pennsylvania, have invented a new and useful Improvement in Lathes, of which the following is a full, clear, and exact description, reference being had to the accompanying drawings, which form a part of this specification.

My invention relates particularly to lathes for turning the rims of locomotive driving wheels and car wheels or machines of similar character, in which the feeding motion of the tool or tools is actuated from a crank or from a shaft having a rocking or oscillating motion about its axis. Such lathes require a power feed motion to advance the tool substantially parallel with the axis of the lathe and sometimes also require a power cross-feed at a right angle with the longitudinal feed.

The object of my invention is to provide a simple and inexpensive device, by which both feeding movements may be actuated from a single operating means, such as a connecting rod from a crank or from a lever on a rock shaft.

I also construct it so that it may be readily added or omitted as required. These results I accomplish by using parts of the longitudinal feeding mechanism to operate the cross-feed.

Another object of my invention is to provide power actuated cross-feed mechanism which can readily be applied to lathes of the type shown now on the market, and which mechanism is adapted to be adjusted to compensate for the adjustment of the tool carriage.

Fig. 1 is a cross-section of a lathe showing one form of my improved tool feeding mechanism with the parts in one position.

Fig. 2 is a similar view showing the parts in a different position.

Figure 3:
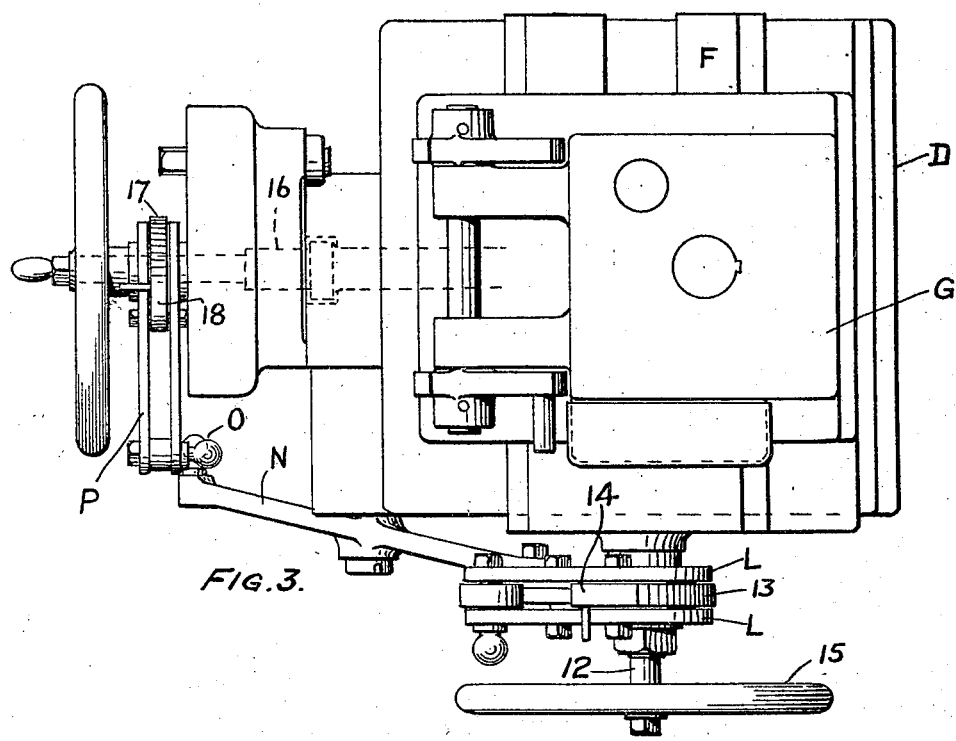
Fig. 3 is a plan view of the tool carriage and the operating mechanism on a larger scale.

In these drawings, the reference character A designates the bed of a lathe and B the face plate on the head stock (not shown) which is rotated in the usual manner. C is a saddle arranged to be moved longitudinally along the bed A and 10 are bolts for securing the saddle in its adjusted position. Mounted for transverse adjustment on the saddle C is a tool housing D which is secured in its adjusted position to the saddle by bolts 11, the arrangement of the saddle and tool carriage being such that they may be adjusted longitudinally and transversely to position the tool with relation to the portion of the work piece to be machined. E is a cross motion slide guide secured to the tool housing D, and F is a slide arranged to be moved transversely along the slide guide E. The slide F has a guide on which is slidably mounted a slide G to which the tool is secured. 12 is a feed screw mounted on the slide F and is connected to the slide G by means of the usual nut carried by said slide to be moved.

Journaled on the screw 12 is a ratchet lever L which comprises two plates, one on each side of a ratchet wheel 13. 14 is a pawl carried by the plates forming the lever L, which is arranged to rotate the screw 12 step by step when the ratchet lever L is oscillated. 15 is a hand wheel carried by the screw 12 for adjusting the tool longitudinally by hand. 16 is a feed screw carried by the slide guide E which is arranged to feed the slide F transversely by the usual nut carried thereby.

P is a ratchet lever mounted for oscillation on the screw 16, and which also comprises plates on opposite sides of a ratchet wheel 17 secured to the screw 16. 18 is a pawl mounted between the plates of the ratchet lever P which is arranged to move the ratchet wheel step by step when the lever is oscillated to feed the slide F and tool transversely.

H is a rock shaft journaled in bearings on the frame A and which is vibrated in the usual manner for actuating the tool feed mechanism. Keyed to the shaft H in such a manner that it can be adjusted along the shaft with the saddle C is a lever I. K is a connecting rod connected to the lever I and the ratchet lever L by means of ball and socket connections, as clearly shown. Pivoted to a bracket on the slide E is a lever N, one end of which is connected to the ratchet lever L by means of a link M. The other end of the lever N is connected to the ratchet lever P by means of a rod O.

Figure 4:
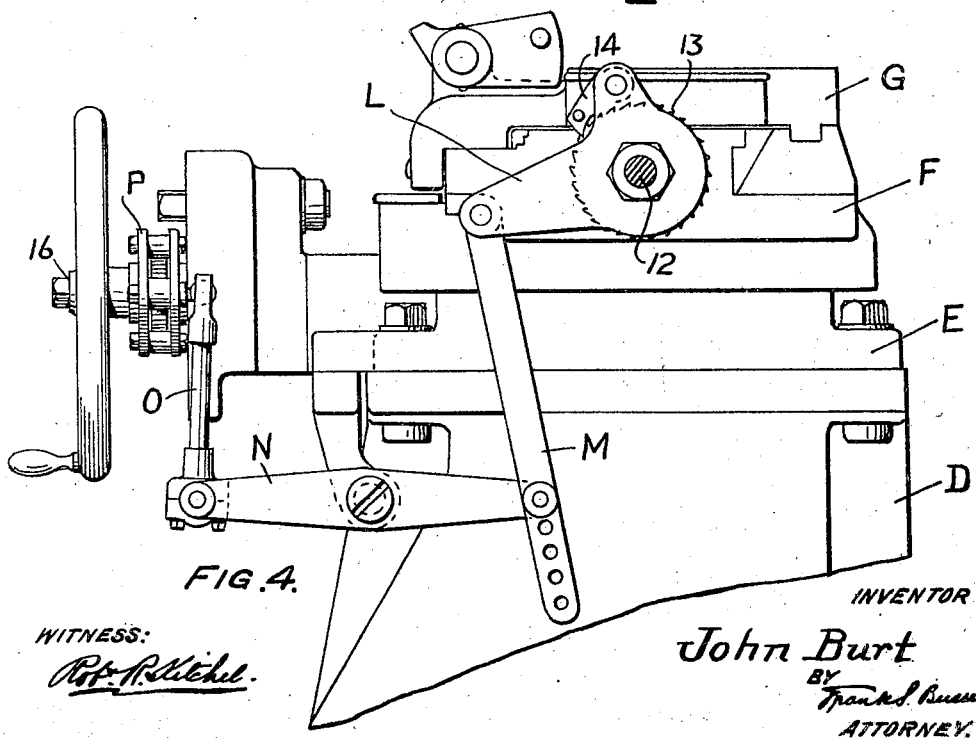
Fig. 4 is an end elevation of the device shown in Fig. 3.
Figure 5:
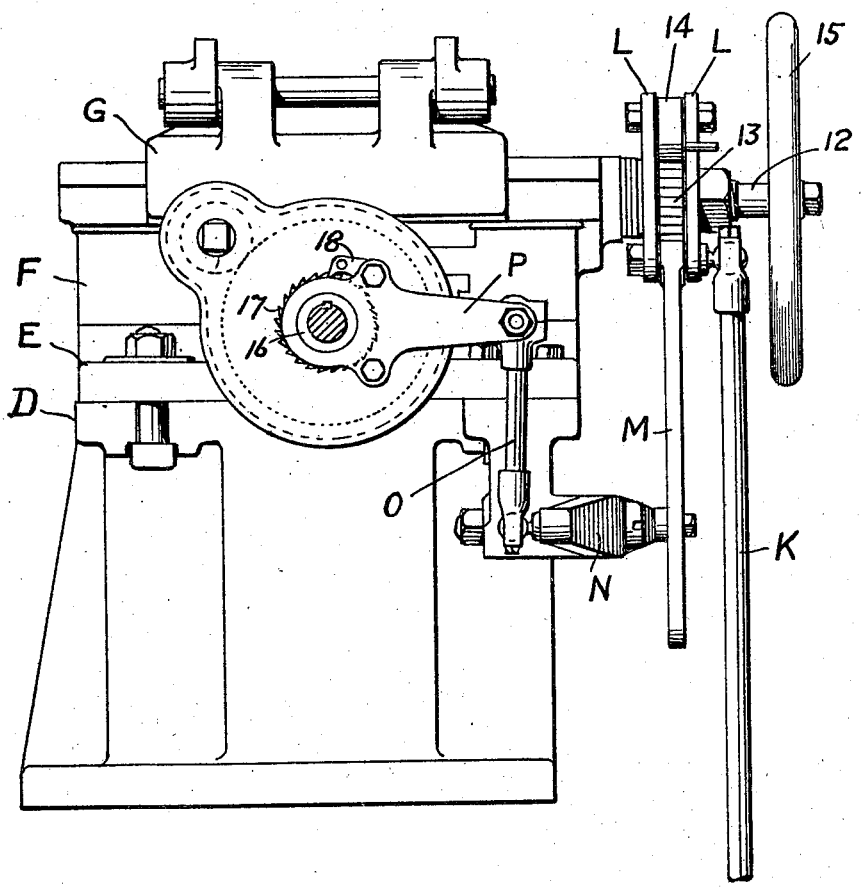
Fig. 5 is a side view thereof.

The rod O is connected to the levers N and P by means of ball and socket connections as shown in Figs. 3–5.

The lever I is provided with more than one point of attachment for the rod K, and are provided to properly position the lever L with relation to the lever I when the housing D is adjusted transversely with relation to the work. The link M is also provided with a number of holes for the pin for connecting the link M to the lever N to compensate for the shifting of the lever L caused by the shifting of the carriage D when adjusting the carriage transversely with relation to the work.

In Figs. 1 and 2, the tool slide G differs slightly from the tool slide shown in the other figures of the drawings.

In all of the figures the cross slide F is below the longitudinal slide G, but it will readily be appreciated by those familiar with the art that the arrangement may readily be reversed.

In the embodiment shown, the lathe is adapted for facing the hubs of large wheels, such as locomotive driving wheels, and for turning the periphery of such wheels.

When it is desired to turn the periphery of the wheel, the parts are positioned as shown in Fig. 1, the pawl 18 being thrown out of action and the pawl 14 into action so that the tool will be fed longitudinally. If it is desired to face the rim of the wheel, the parts may be left in the same positions with the exception of the pawls, and in this case pawl 18 is thrown into action and the pawl 14 is thrown out of action.

When facing the hubs of wheels, the carriage D is shifted transversely as shown in Fig. 2 and the link M is connected to the lever N to give the best driving connection between the levers N and L. In this case, pawl 18 is thrown into action and pawl 14 is thrown out of action, to feed the tool along the face of the hub.

The advantages of my invention result from the provision of tool feeding mechanism for feeding the tool either longitudinally or transversely in connection with an adjustable carriage which is arranged to be shifted transversely for machining articles such as locomotive driving wheels in which both feeding devices are actuated from a single operating means.

A further advantage results from the provision of simple lever mechanism for actuating both feeds which are adapted to be actuated from the same rock shaft, and which lever mechanism is arranged to be adjusted to compensate for the shifting of the carriage, as well as a lever mechanism which can readily be applied or removed.

Having now fully described my invention, what I claim and desire to protect by Letters Patent is:

1. A lathe having a transversely adjustable housing, a transversely movable slide, a longitudinally movable slide, a separate feed mechanism for each slide, actuating devices for each feed mechanism, actuating means arranged to be driven from the lathe, a connection between the actuating means and one of the actuating devices adapted to permit adjustment of the housing, and connections between the actuating devices.

2. A lathe having a transversely adjustable housing, a transversely movable slide, a longitudinally movable slide, a separate feed mechanism for each slide, actuating devices for each feed mechanism, actuating means arranged to be driven from the lathe, a connection between the actuating means and one of the actuating devices adapted to permit adjustment of the housing, and adjustable connections between the actuating devices.

3. A lathe having a transversely adjustable housing, a transversely movable slide, a longitudinally movable slide, a separate feed mechanism for each slide, actuating devices for each feed mechanism, adjustable lever connections between the actuating devices, actuating means arranged to be driven from the lathe, and an adjustable connection between the actuating means and the actuating devices.

4. A lathe having a transversely adjustable housing, a transversely movable slide, a longitudinally movable slide, a separate feed mechanism for each slide, actuating devices for each feed mechanism, adjustable connections between the actuating devices, a rock shaft, and a connection between the rock shaft and one of the actuating devices.

5. A lathe having a transversely and longitudinally adjustable housing, a transversely movable slide and a longitudially movable slide on the carriage, a feed screw for each slide, a separate ratchet mechanism for each screw, lever connections between said ratchet mechanisms, a rock shaft, and actuating connections between the rock shaft and the ratchet lever connections.

6. A lathe having a transversely adjustable housing, a slide movably mounted on the carriage, a second slide mounted on the first slide and arranged to move at right angles to the first slide, a feed screw for each slide, a ratchet wheel on each screw, a pawl lever for each ratchet wheel, a pawl on each ratchet lever, a lever pivotally connected to each ratchet lever, a rock shaft, and an actuating connection between the rock shaft and one of the pawl levers.

7. A lathe having a transversely adjustable housing, a slide movably mounted on the carriage, a second slide mounted on the first slide and arranged to move at right angle to the first slide, a feed screw for each slide, a ratchet wheel on each screw, a pawl lever for each ratchet wheel, a pawl on each ratchet lever, a pivoted lever, a link connection to each pawl lever and the pivoted lever, one of said links being adjustable to vary the length thereof, a rock shaft, and an actuating connection between the rock shaft and the pawl levers.

8. A lathe having a transversely adjustable housing, a slide movably mounted on the carriage, a second slide mounted on the first slide and arranged to move at right angles to the first slide, a feed screw for each slide, a ratchet wheel on each screw, a pawl lever for each ratchet wheel, a pawl on each ratchet lever, a pivoted lever, a link connected to each pawl lever and the pivoted lever, one of said links being adjustable to vary the length thereof, a rock shaft, and an adjustable actuating connection between the rock shaft and the pawl levers.

9. A lathe having a transversely movable slide, a longitudinally movable slide, a separate feed mechanism for each slide, actuating devices for each feed mechanism, adjustable connections between the actuating devices, a rock shaft, and a connection between the rock shaft and one of the actuating devices.

In testimony of which invention, I have hereunto set my hand, at Philadelphia, on this 6th day of May, 1921.

JOHN BURT.